United States Patent
Whitefield et al.

(10) Patent No.: US 7,039,556 B2
(45) Date of Patent: May 2, 2006

(54) SUBSTRATE PROFILE ANALYSIS

(75) Inventors: Bruce J. Whitefield, Camas, WA (US); David A. Abercrombie, Gresham, OR (US)

(73) Assignee: LSI Logic Corporation, Milpitas, CA (US)

( * ) Notice: Subject to any disclaimer, the term of this patent is extended or adjusted under 35 U.S.C. 154(b) by 18 days.

(21) Appl. No.: 10/867,003

(22) Filed: Jun. 14, 2004

(65) Prior Publication Data

US 2005/0288896 A1   Dec. 29, 2005

(51) Int. Cl.
*G06F 11/30* (2006.01)
*G21C 17/00* (2006.01)

(52) U.S. Cl. .................................................... 702/183
(58) Field of Classification Search ................ 702/183
See application file for complete search history.

(56) References Cited

U.S. PATENT DOCUMENTS

| | | | |
|---|---|---|---|
| 2003/0229410 A1* | 12/2003 | Smith et al. ................. | 700/109 |
| 2004/0162692 A1* | 8/2004 | Ye et al. ...................... | 702/117 |
| 2005/0060336 A1* | 3/2005 | Abercrombie et al. ...... | 707/102 |
| 2005/0132308 A1* | 6/2005 | Whitefield et al. ............ | 716/4 |

* cited by examiner

*Primary Examiner*—Michael Nghiem
(74) *Attorney, Agent, or Firm*—Luedeka, Neely & Graham PC

(57) ABSTRACT

A system for analyzing fabrication processes, such as analyzing device yield on a substrate. An input accesses fabrication information, where the fabrication information includes at least one of an dependent variable that is associated with substrate location information, and at least one independent variable that is associated with at least one of the fabrication processes. Desired portions of the substrate information are selected, based on at least one of the independent variable and the dependent variable. A substrate profile is produced, based on the desired portions of the fabrication information.

18 Claims, 3 Drawing Sheets

Combined Profile

Tool A only

Tool B only

Typical Defect Pattern

Model Modified Profile

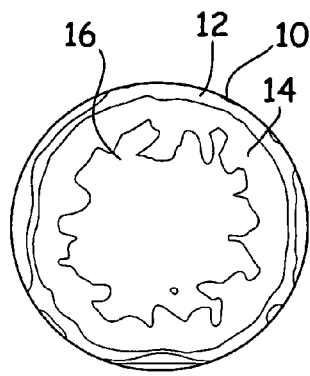
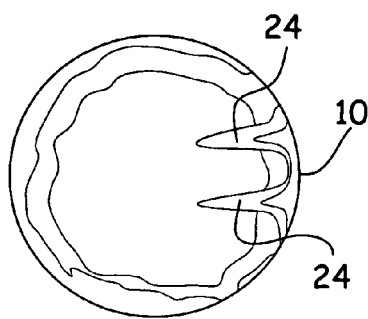
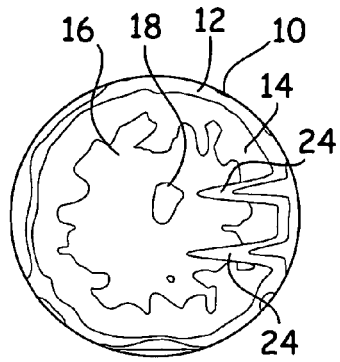
Combined Profile
Fig. 3A
Typical Defect Pattern
Fig. 3B
Model Modified Profile
Fig. 3C
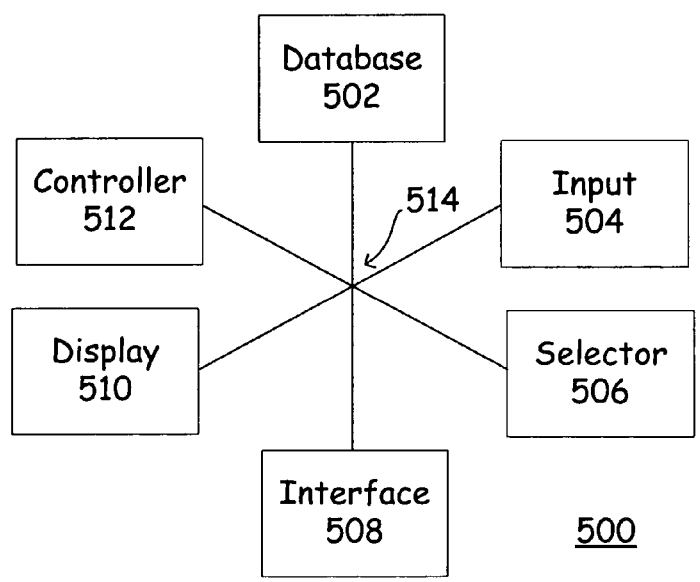
Fig. 5

Fig. 4

| Water Profile Analysis Table | | | | | |
|---|---|---|---|---|---|
| Modifiers / Profile Types -> | Baseline | | | | |
| Title | Baseline | Poly Etch ETH21601 | Poly Etch ETH21602 | Poly Etch ETH21602 | CMP Jets | Metal Lift Pins |
| Type | All | Partition | Partition | Partition | Model Modified | Model Modified |
| Time | Past 10 Weeks | Past 4 Weeks | | | Past 6 to 2 weeks | Past 6 to 2 |
| Device | All | All | All | All | All | CP8M only |
| Tool/Step | All | Only ETH21601@ Poly Etch | Only ETH21601@ Poly Etch | Only ETH21602@ Poly Etch | All | M1EF |
| Smoothing | Standard | Standard | Standard | Standard | Standard | Standard |
| Resolution | 1mm | 1mm | 1mm | 1mm | 1mm | 1mm |
| Model | | | | | BaselineBin 1+CMP Inspect | Baseline Bin 1+CMP Inspect |
| Match | Key | All | All | All | Edge Zone | Custom Zone |
| % Match | 100% | 90% | 80% | | 15% | 10% |
| Show | Profile | Profile | Profile | | Difference | Difference |
| Parameter | Baseline | Poly Etch ETH21601 | Poly Etch ETH21602 | Poly Etch ETH21602 | CMP Jets | Metal Lift Pins |
| Bin 1 | ○ | ○ | ○ | ○ | ○ | |
| CMP Inspect | | | | ○ | | |
| M1EF Inspect | | | | | | ○ |

400

SUBSTRATE PROFILE ANALYSIS

FIELD

This invention relates to the field of substrate processing. More particularly, this invention relates to using integrated circuit yield information to identify and correct integrated circuit fabrication problems.

BACKGROUND

Modern integrated circuits are extremely complex devices that are fabricated using equally complex processes. As the term is used herein, "integrated circuit" includes devices such as those formed on monolithic semiconducting substrates, such as those formed of group IV materials like silicon or germanium, or group III–V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices. Because of the complexity of integrated circuits and the processes by which they are formed, it can be extremely difficult to determine the reasons why some devices function properly and other devices function improperly, or fail altogether.

Integrated circuits are typically manufactured on thin silicon substrates, commonly referred to as wafers. The wafer is divided up onto smaller rectangular sections for each device, typically known as the die or device. The methods and other embodiments according to the present invention can be applied to processes that are performed on other substrates to make other devices or components, such as flat panel display manufacturing, which is performed on rectangular glass substrates. Thus, this disclosure generally refers to substrates, substrate profiles, and substrate contact points, even though silicon wafer processing may be the most common application for the embodiments of the invention. It is appreciated that the same or similar methods are just as applicable to the analysis of a wide variety of substrates. Wafer test yield of die, or simply yield, is predominantly used as an example herein of an important dependent variable of interest. However, it is appreciated that any other dependent variable that is spatially associated with the substrate can also be used.

One method to assist in failure analysis is mapping important variables, such as yield, according to the position at which the variable is read on the substrate. Wafer mapping, for example, has traditionally been done by plotting the pass/fail data (i.e. yield) or other variable of interest versus the die position on the wafer. These wafer maps can be enhanced by combining values from many wafers in what is known as a stacked map. Recently there have been improvements in substrate mapping that can combine data from many wafers and many devices into what is known as a high-resolution wafer profile. Such substrate profiles are created from databases of information that is associated with substrates. A graphical representation is developed from the information, which representation depicts the yield or other variable read from the devices on the substrate, according to their position on the substrate. Substrate profiles such as these look somewhat like a topographical map, where the various contours of the profile delineate areas of different average (or otherwise computed) yield or other measured variable of interest for the devices bounded by those contours on the substrates.

Such substrate profiles are used by manually inspecting the substrate profile, and thinking about what might be responsible for the patterns depicted in the profile. Obviously, for this method to work at all, some knowledge of the equipment, processes, and methods that are used to process the substrates is required. As the person reviewing the profile acquires greater knowledge of the fabrication process, the interpretation of the information presented in the substrate profile becomes commensurately more accurate and beneficial.

Unfortunately, such a method of reviewing a substrate profile tends to be extremely inefficient. For example, the reviewer may not have the experience needed to identify the patterns caused by different process problems. Even if the reviewer does have a relatively high level of experience, the mundane and repetitive nature of the job may lead to lack-of-attention errors in interpreting the profiles. Further, the amount of information that is compiled in a substrate profile tends to both obscure some problems and confound other problems.

What is needed, therefore, is a system for constructing, using, and interpreting substrate profiles that reduces some of the problems mentioned above.

SUMMARY

The above and other needs are met by a system for analyzing fabrication processes, such as analyzing device yield on a substrate. An input accesses fabrication information, such as the substrate processing history, fabrication equipment used, measurement information, and device yield. The fabrication information includes at least one dependent variable that is associated with substrate location information, and at least one independent variable that is associated with at least one of the fabrication processes. Desired portions of the fabrication information are selected, based on at least one of the independent variable and the dependent variable. A substrate profile is produced, based on the desired portions of the fabrication information.

In this manner, a substrate profile is produced based on information that is selectable by either the person interacting with the system, or by the system itself, such as by acting on programmed instructions. Thus, for example, the fabrication information input to the system can include or exclude certain pieces of processing equipment, or can include or exclude certain measured characteristics of the substrate. By so doing, the person reviewing the substrate profile can quickly determine the effects of certain independent variables on the yield or other dependent variable profile of the substrate. Thus, confounding influences, which are typically present in a substrate profile, can be isolated as to their source.

In various embodiments, the independent variable includes at least one of time frame during which substrates were processed from which the fabrication information was gathered, equipment on which the substrates were processed, and recipes used for processing the substrates. The dependent variable preferably include at least one of measured physical characteristics of substrates from which the fabrication information was gathered, measured electrical characteristics of the substrates, and defect inspection information of the substrates. Means are preferably provided for storing the substrate profile in association with the desired portions of the fabrication information.

Preferably, there are means provided for adjusting the substrate profile, including at least one of adjusting a resolution of the substrate profile, smoothing contours of the substrate profile, adjusting a coordinate system of the substrate profile, and adjusting the substrate profile based on simulations of the fabrication processes. The system is preferably adapted to automatically and graphically compare the substrate profile to a database of historical substrate profiles, where the historical substrate profiles have known associated processing conditions.

A profile analysis table is preferably presented, which has columns of combinations of the fabrication information. Each column preferably includes: (1) a substrate profile produced using the fabrication information for a given one of the columns of combinations; (2) a summary of the fabrication information for the given one of the columns of combinations, and (3) an indication of a degree of similarity between the given one of the columns of combinations and a selected substrate profile.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIGS. 3A through 3C are a representation of how substrate profiles according to a preferred embodiment of the present invention are modified by selectively adding fabrication information.

FIG. 4 is a representation of a profile analysis table according to a preferred embodiment of the present invention.

FIG. 5 is a functional block diagram of a system according to a preferred embodiment of the present invention.

DETAILED DESCRIPTION

Figure 1A:
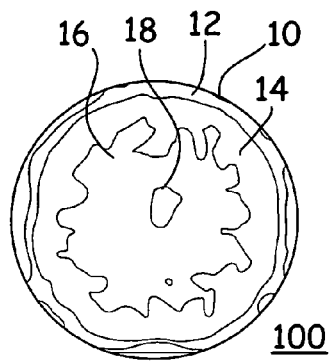
FIGS. 1A through 1C are a representation of how substrate profiles according to a preferred embodiment of the present invention are changed by selectively removing fabrication information.

According to the preferred embodiments of the present invention, a user's ability to identify unique patterns in substrate profiles and associate the patterns with the source of the patterns is enhanced through the use of a database, which preferably includes substrate profiles, and which can be quickly and selectively manipulated to generate for comparison many variations and subsets of the substrate profiles. A method for selecting and displaying for comparison the profiles generated by the system is also disclosed. The system enables the user to compare patterns to each other and to the overall substrate profile. It is also enables automatic comparisons and rankings of the degree to which profiles match each other.

A central aspect of the preferred system according to the present invention is a fabrication information database that enables a user or computer-driven comparison algorithm to quickly compare substrate profiles one to another, to determine how well the profile patterns match. The database preferably contains the data used to generate the substrate profiles, such as substrate test data, measurement data, or defect inspection data, which information is considered to be dependent variables, as the term is used herein. The dependent data tends to be specific to individual devices on the substrate, or to other discrete locations on the substrate, and thus all such dependent variables are most preferably stored in the database in association with location information for the substrate, such as x and y coordinates. The dependent variables are generally referred to as yield or yield information herein.

In addition, the database preferably contains information about the substrate fabrication processes that result in the substrate profile appearing the way that it does. For semiconductor substrate manufacturing this is commonly known as the lot or substrate history. The lot or substrate history includes data associated with the process tools, recipes, and other manufacturing conditions that were used on a given substrate or lot at the various steps of its manufacturing process. As used herein, this information is referred to as independent variables. The independent variables typically do not have location information associated with them, because the independent variables typically apply as a group to an entire substrate, such as the piece of equipment that the substrate was processed through, or the time at which the processing occurred. However, some independent variables can have location information associated with them.

With this combination of fabrication information, substrate profiles can be quickly produced. The database preferably enables substrate profiles to be calculated using different subsets of the data, most preferably based on a selection of the independent variables. For example, the substrate profile can be calculated based only on the substrates that went through a certain process tool. This profile can be compared to the profile of the substrates that went through a different process tool, to see which tool has the best yield, or if one tool has an undesirable yield pattern. This approach can be very useful in identifying the source of a pattern that is causing yield loss.

It is appreciated that the substrate profiles can be produced based on different dependent variables also. For example, the substrate profiles produced using the selection of independent variables as given in the example above can also be based on one or more electrical characteristic of the devices as measured at final test. In this manner, the effects of different processing tools on specific electrical parameters can also be visually determined using the substrate profiles as described herein. Thus, an overall pass/fail designation for the devices is not the only dependent variable on which the substrate profiles can be based.

There are preferably three major types of variables that are used for generating substrate profiles. These variables are preferably manipulated to create useful versions of the substrate profiles. These manipulated variables are (1) data selection, (2) measurement basis, and (3) profile calculation. These are described in more detail below.

Data selection is the subset of data that is included in the calculation by which the substrate profile is produced. The data can preferably be selected in many different ways, such as limiting to a certain time frame, processing tool, process recipe, and so forth. Any subset of the original data that defines how substrates were processed can preferably be used in this way. It can preferably selectively include combinations of tools or different process recipes. This method generally equates to the selection of independent variables, as the concept of such is introduced above.

Measurement basis is the measurement that the substrate profile is calculated for. There are many different types of measurements that can be used, such as the substrate sort test bin, film thickness measurements, or substrate defect inspection data. This method generally equates to the selection of dependent variables, as the concept of such is introduced above.

The profile calculation method is a variation in the calculation, such as the resolution at which the substrate profile is produced, smoothing algorithms used for the contours of the substrate profile, or coordinate assignment algorithms used to overlay the data used in producing the substrate profile. This type of manipulation could also include algorithmically modifying selected portions of the substrate profile, so that it simulates what a substrate profile would look like for substrates that were processed according to a theoretical process flow, or otherwise subjected to a selected combination of processing conditions. The profile manipulations can thereby be used either individually or in combination to create various profiles of interest. Profile manipulations are applied to substrate profiles that are generated using one of the two methods described above. Examples of how these manipulations are accomplished are described in greater detail below.

Data Selection Method

In this example, substrate profiles are preferably created from subsets of the entire dataset, which subsets preferably include substrates run only in specific tools or processes. For example, only the substrates that went through etcher A at a given process step are used to generate one of the substrate profiles. This substrate profile is then compared to a substrate profile for all etchers, or to a substrate profile generated from all of the substrates that were processed on etcher B. FIG. 1 shows how such profiles might differ.

As depicted in FIG. 1A, a substrate profile 100 depicts the profile for a combination of tools. The substrate 10 is represented with various gradient lines 12 that depict regions of differing dependent variable values. For example, region 14 may represent an area on the substrate 10 that generally has a lower yield than those devices that are disposed within region 16 on the various substrates 10 that were included in the substrate profile 100 as depicted. Further, central region 18 may depict a region of very low yield for the dependent variable or variables selected for the substrate profile 100. Because the substrate profile 100 as depicted in FIG. 1A is for all tools, it is impossible to tell from the substrate profile 100 of FIG. 1A whether the region 18 of very low yield is dependent on one or more of the tools or some other independent variable.

Figure 1B:
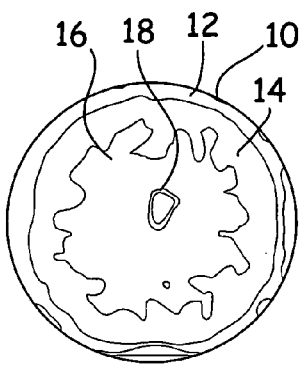
Figure 1C:
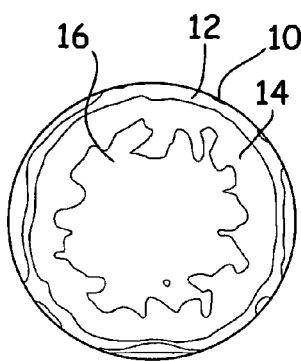

According to the prior art for substrate profiles, such a confounding and obscuring of the source of the yield problem in region 18 would go unresolved by reference only to the prior art substrate profile. However, according to the preferred methods of the present invention, the substrate profile 100 can be recomputed using different selections of the independent variables, such as the tool used to process the substrates, so as to resolve the source of the yield problem indicated by region 18. FIG. 1B depicts the substrate profile 100 for just tool A, and FIG. 1C depicts the substrate profile 100 for just tool B. By comparing the substrate profile 100 for tool A to the substrate profile 100 for tool B, it is readily seen that the region 18 of low yield is produced solely within tool A. Thus, it is readily determined that tool A has a problem, and tool B does not—at least not in regard to the region 18.

Measurement Basis Method

Many of the measurement tools that are used during substrate processing are capable of measuring across the substrate surface and associating a die or other substrate position, such as an x-y coordinate, to the measurement. This information is preferably translated into a common substrate profile coordinate system. An example of this type of data is gate oxide thickness measurements from an ellipsometer. In general, any measurable or tested parameter that can be associated with a location on the substrate can be converted into a substrate profile.

One type of data that fits this criteria is generated by automated defect inspection equipment. Such defect inspection maps are preferably converted to the substrate profile format with contour lines, so that they can be compared against other types of substrate profiles.

Figure 2A:
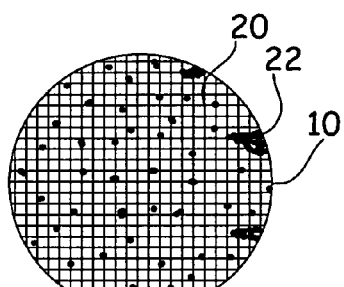
FIGS. 2A through 2B are a representation of how substrate profiles according to a preferred embodiment of the present invention are created from fabrication information that is spatially associated with the substrate, but not limited to die or device boundaries.
Figure 2B:
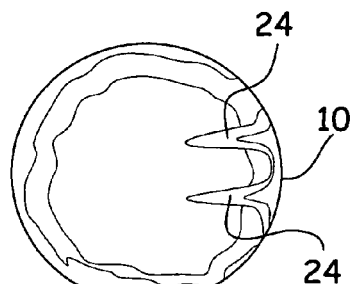

FIG. 2A depicts an example of a defect inspection map after a chemical mechanical polishing process, where a problem is occurring due to the water jet pressure being set too high on the right side of the substrate. The defect inspection map depicted in FIG. 2A depicts individual dice 20 and discrete defects 22. However, because the information in the defect inspection map has location information associated with it, the information from a database of defect inspection maps can be converted into a substrate profile as depicted in FIG. 2B. As depicted in FIG. 2B, the regions 24 of reduced yield are quite evident when presented in the substrate profile 100 format. After the information is converted to a substrate profile format, all of the applicable methods for analyzing profiles described herein can be applied to the measurement based data.

Profile Calculation Method

The profile calculation method preferably includes modifying the data that is used to create the substrate profile, so as to simulate the presence of a problem. Substrate profiles are preferably first created using normal methods or a selectable subset of the database. The resulting substrate profile as given in FIG. 3A is then preferably modified to show what the overall substrate profile would look like if a specific problem were to occur. For example, the substrate profile 100 as given in FIG. 3A can be combined with the substrate profile 100 as depicted in FIG. 3B, which depicts the water jet problems as discussed above, to produce the substrate profile 100 as depicted in FIG. 3C.

This process can be useful, for example, to monitor for damage that occurs near a point where equipment touches the edge of the substrate, if the substrate handling is miss adjusted. Thus, if the effect of a problem has been seen before, the substrate profile signature for the problem can be combined into a model that modifies a clean or current reference profile. The model could be produced in many ways. For example, a simple cell by cell averaging is used in the example depicted in FIG. 3C.

Profile Analysis Table

A user interface called a Profile Analysis Table 400 as depicted in FIG. 4 is preferably employed to generate and use the substrate profiles 100. The Profile Analysis Table 400 preferably organizes images of the substrate profiles 100 into columns 402 and rows 408, with an indication of how they are generated (such as the data selection and profile calculation methods) given in row 412, with summaries of the variable selections given in rows 406. An indication of the degree of similarity between the substrate profile 100 of a given column 402 and a selected substrate profile is preferably provided for each column 402, such as in row 410. The graphical images are arranged in rows that represent a common measurement basis for easy comparison of profiles that are produced with a different data selection or profile calculation.

In a most preferred embodiment, the various substrate profiles 100 as described herein are all saved in a graphical format in the database. Thus, when a new substrate profile 100 is generated, it can be automatically compared to the existing substrate profiles 100 under the control of the system, such as by using image comparison techniques. Thus, as depicted in FIG. 4, the system itself can provide an indication of how well different substrate profiles 100 compare to each other, and thus the system itself can provide an initial diagnosis of any problems that may be evident in the newly constructed substrate profile 100. This is preferably accomplished by matching graphical elements between new and old substrate profiles 100, where the graphical features of the old substrate profiles 100 have preferably been identified as to their source.

The method as described herein can be implemented in a variety of different ways. Although the system can be implemented manually, where the substrate profiles are manually computed and stored, such a system would tend to be at the lower end of the range of utility that can be provided by the system. Alternately, the system can be implemented as a dedicated hardware and software system, capable only of producing the substrate profiles and tables as described herein. Most preferably, however, the system is implemented on a general computing platform, such as a personal computer. In various embodiments, the system is distributed across a computer network, with various functional units of the system disposed on different physical platforms that are all logically coupled through the network.

FIG. 5 depicts a functional block diagram of a preferred embodiment of the system 500 according to the present invention. The system 500 preferably includes a database 502 that contains all of the fabrication information as described above. An input 504 provides for communication between the various elements of the system 500, such as communication to the database 502. A selector 506 selects various portions of the information that is resident in the database 502. Most preferably, the selections are made such as through a human interface 508, such as a mouse or a keyboard. The substrate profiles 100 and other information and controls are preferably presented such as on a display 510. A controller 512 is preferably programmed to perform the calculation of the substrate profiles 100 as described above. The various elements preferably communicate one with another such as through a buss or network 514.

The controller 512 is preferably adapted to adjust the substrate profiles 100, such as under the control of a user through the interface 508, or under the control of a preprogrammed recipe. In various embodiments the resolution at which the substrate profiles 100 are calculated or displayed is adjustable. In addition, the algorithms used to smooth the contours between regions of the substrate profiles 100 are preferably also selectable and adjustable. Further, the substrate profiles 100 are preferably adjustable as to the coordinate system used for the substrate profiles 100, or in other words the location information that is used to construct the substrate profiles 100.

In summary, the database preferably contains image, substrate test data, substrate measurement data, substrate inspection data, and associated substrate processing and location information, so that substrate profiles can be quickly generated, reviewed and compared. The Profile Analysis Table facilitates working with substrate profiles, for purposes such as comparing and identifying patterns caused by variables in the substrate processing. A substrate profile can be generated from a subset of the data, so that the maps resulting from processing differences can be compared to one another. Substrate profiles can be modified with a model so that they simulate the profile that would be expected from a processing difference.

Model modified profiles can be based on a dynamic substrate profile that is generated automatically from recent fabrication data. Substrate profiles can be created with a common coordinate system from defect inspection data, so that they can be compared to profiles generated such as by substrate test, substrate measurement, model modified, or other means. Substrate profiles are preferably created with a common coordinate system from substrate measurement data, so that they can be compared to profiles generated by substrate test, substrate inspection, model modified, or other means. A difference profile can be created for profile comparisons, where one or more profiles are subtracted from each other.

Thus, the system according to the preferred embodiments of the present invention enables users to quickly generate and compare substrate profiles, to determine what substrate processing affects which profile. Users can quickly see what substrate profiles exist, and use the system to quickly track down the source of undesirable patterns. The system preferably provides automatic comparisons and quantitative matching so that known profile-effecting mechanisms can be detected quickly, thereby enabling a faster response and reducing the number of integrated circuits effected.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A system for analyzing fabrication processes, the system comprising:

an input for accessing fabrication information, where the fabrication information includes at least one independent variable that is associated with substrate location information, and at least one dependent variable that is associated with at least one of the fabrication processes, wherein the independent variable includes at least one of time frame during which substrates were processed from which the fabrication information was gathered, equipment on which the substrates were processed, recipes used for processing the substrates, and fabrication conditions associated with the substrates, wherein the dependent variable includes at least one of measured physical characteristics of substrates from which the fabrication information was gathered, measured electrical characteristics of the substrates, and defect inspection data of the substrates, means for selecting desired portions of the fabrication information based on at least one of the independent variable and the dependent variable, means for producing a substrate profile based on the desired portions of the fabrication information, means for adjusting the substrate profile, including at least one of adjusting a resolution of the substrate profile, smoothing contours of the substrate profile, adjusting a coordinate system of the substrate profile, and adjusting the substrate profile based on simulations of the fabrication processes, and means for automatically and graphically comparing the substrate profile to a database of historical substrate profiles, where the historical substrate profiles have known associated fabrication conditions.

2. A system for analyzing fabrication processes, the system comprising:

an input for accessing fabrication information, where the fabrication information includes at least one independent variable that is associated with substrate location information, and at least one dependent variable that is associated with at least one of the fabrication processes, means for selecting desired portions of the fabrication information based on at least one of the independent variable and the dependent variable, means for producing a substrate profile based on the desired portions of the fabrication information, and means for presenting a profile analysis table having columns of combinations of the fabrication information that are cross-indexed by rows of substrate profiles having at least one common measurement basis, with each column including, a substrate profile produced using the fabrication information included in a given one of the columns of combinations, a summary of the fabrication information for the given one of the columns of combinations, and an indication of a degree of similarity between the given one of the columns of combinations and a selected substrate profile.

3. The system of claim 2, wherein the independent variable includes at least one of time frame during which substrates were processed from which the fabrication information was gathered, equipment on which the substrates were processed, recipes used for processing the substrates, and fabrication conditions associated with the substrates.

4. The system of claim 2, wherein the dependent variable includes at least one of measured physical characteristics of substrates from which the fabrication information was gathered, measured electrical characteristics of the substrates, and defect inspection data of the substrates.

5. The system of claim 2, further comprising means for adjusting the substrate profile, including at least one of adjusting a resolution of the substrate profile, smoothing contours of the substrate profile, adjusting a coordinate system of the substrate profile, and adjusting the substrate profile based on simulations of the fabrication processes.

6. The system of claim 2, further comprising means for automatically and graphically comparing the substrate profile to a database of historical substrate profiles, where the historical substrate profiles have known associated fabrication conditions.

7. The system of claim 2, further comprising means for storing the substrate profile in association with the desired portions of the historical integrated circuit information.

8. The system of claim 2, wherein the substrate is one of a monolithic semiconducting integrated circuit substrate, a flat panel display, and a solar cell array.

9. The system of claim 2, wherein the fabrication information includes integrated circuit test information, integrated circuit inspection information, and integrated circuit processing information.

10. A method of analyzing substrate yield, the method comprising the steps of:

accessing fabrication information, where the fabrication information is associated at least in part with substrate location information, selecting desired portions of the fabrication information based on at least one of an independent variable and a dependent variable, wherein the independent variable includes at least one of time frame during which substrates were processed from which the fabrication information was gathered, equipment on which the substrates were processed, recipes used for processing the substrates, and fabrication conditions associated with the substrates, wherein the dependent variable includes at least one of measured physical characteristics of substrates from which the fabrication information was gathered, measured electrical characteristics of the substrates, and defect inspection data of the substrates, producing a substrate profile based on the desired portions of the fabrication information, adjusting the substrate profile, including at least one of adjusting a resolution of the substrate profile, smoothing contours of the substrate profile, adjusting a coordinate system of the substrate profile, and adjusting the substrate profile based on simulations of substrate processing, and automatically and graphically comparing the substrate profile to a database of historical substrate profiles, where the historical substrate profiles have known associated fabrication conditions.

11. A method of analyzing substrate yield, the method comprising the steps of:

accessing fabrication information, where the fabrication information is associated at least in part with substrate location information, selecting desired portions of the fabrication information based on at least one of an independent variable and a dependent variable, producing a substrate profile based on the desired portions of the fabrication information, and presenting a profile analysis table having columns of combinations of the fabrication information, cross-indexed by rows of substrate profiles having at least one common measurement basis, with each column including, a substrate profile produced using the fabrication information for a given one of the columns of combinations, a summary of the fabrication information for the given one of the columns of combinations, and an indication of a degree of similarity between the given one of the columns of combinations and a selected substrate profile.

12. The method of claim 11, wherein the independent variable includes at least one of time frame during which substrates were processed from which the fabrication information was gathered, equipment on which the substrates were processed, recipes used for processing the substrates, and fabrication conditions associated with the substrates.

13. The method of claim 11, wherein the dependent variable includes at least one of measured physical characteristics of substrates from which the fabrication information was gathered, measured electrical characteristics of the substrates, and defect inspection data of the substrates.

14. The method of claim 11, further comprising the step of adjusting the substrate profile, including at least one of adjusting a resolution of the substrate profile, smoothing contours of the substrate profile, adjusting a coordinate system of the substrate profile, and adjusting the substrate profile based on simulations of substrate processing.

15. The method of claim 11, further comprising the step of automatically and graphically comparing the substrate profile to a database of historical substrate profiles, where the historical substrate profiles have known associated fabrication conditions.

16. The method of claim 11, further comprising the step of storing the substrate profile in association with the desired portions of the fabrication information.

17. The method of claim 11, wherein the substrate is one of a monolithic semiconducting integrated circuit substrate, a flat panel display, and a solar cell array.

18. The method of claim 11, wherein the fabrication information includes integrated circuit test information, integrated circuit inspection information, and integrated circuit processing information.

* * * * *